US008272781B2

United States Patent
Nale (10) Patent No.: US 8,272,781 B2
(45) Date of Patent: Sep. 25, 2012

(54) DYNAMIC POWER CONTROL OF A MEMORY DEVICE THERMAL SENSOR

(75) Inventor: William H. Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 1085 days.

(21) Appl. No.: 11/497,946

(22) Filed: Aug. 1, 2006

(65) Prior Publication Data

US 2008/0043556 A1 Feb. 21, 2008

(51) Int. Cl.
*G01K 7/00* (2006.01)
*G01K 13/00* (2006.01)

(52) U.S. Cl. ............ 374/178; 374/141; 374/1; 702/130; 702/99; 711/105

(58) Field of Classification Search .......... 374/170–172, 374/178, 141, 173; 331/66; 365/211, 212; 326/93; 327/512, 513; 702/130–136
See application file for complete search history.

(56) References Cited

U.S. PATENT DOCUMENTS

| | | | |
|---|---|---|---|
| 5,487,607 A | 1/1996 | Makita et al. | |
| 5,796,993 A * | 8/1998 | Maguire | 713/500 |
| 5,857,095 A * | 1/1999 | Jeddeloh et al. | 713/401 |
| 6,072,948 A * | 6/2000 | Saitoh et al. | 703/14 |
| 6,542,104 B1 * | 4/2003 | Capofreddi | 341/160 |
| 6,637,934 B1 | 10/2003 | Henerson et al. | |
| 6,789,037 B2 | 9/2004 | Gunther et al. | |
| 6,934,652 B2 | 8/2005 | Gauthier et al. | |
| 6,959,258 B2 * | 10/2005 | Smith et al. | 702/132 |
| 6,974,252 B2 * | 12/2005 | Bowden et al. | 374/163 |
| 7,035,157 B2 * | 4/2006 | Chang | 365/222 |
| 7,190,628 B2 * | 3/2007 | Choi et al. | 365/222 |
| 7,193,918 B2 * | 3/2007 | Harrand et al. | 365/222 |
| 7,257,725 B2 * | 8/2007 | Osaka et al. | 713/500 |
| 7,296,928 B2 * | 11/2007 | Bowden et al. | 374/163 |
| 7,441,949 B2 * | 10/2008 | Janzen et al. | 374/171 |
| 7,477,083 B2 * | 1/2009 | Fujisawa et al. | 327/158 |
| 7,508,250 B1 * | 3/2009 | Bernstein et al. | 327/512 |
| 7,516,434 B2 * | 4/2009 | Okabe | 716/119 |
| 7,535,786 B1 * | 5/2009 | Walker | 365/222 |
| 7,556,206 B2 * | 7/2009 | Chivers | 236/46 R |
| 7,677,796 B2 * | 3/2010 | Janzen et al. | 374/171 |

(Continued)

FOREIGN PATENT DOCUMENTS

JP 1112 3180 10/1997

(Continued)

OTHER PUBLICATIONS

Farrell: Core Architecture Doubles Mem Data Rate, 4 pages.

(Continued)

*Primary Examiner* — Gail Verbitsky
(74) *Attorney, Agent, or Firm* — Blakely, Sokoloff, Taylor & Zafman LLP (57) ABSTRACT

Embodiments of the invention are generally directed to systems, methods, and apparatuses for the dynamic power control of a memory device thermal sensor. In some embodiments a memory device includes an on-die thermal sensor and enable logic to dynamically enable or disable the on-die thermal sensor. In some embodiments, the on-die thermal sensor senses thermal data responsive to a thermal data sense indication. The thermal data sense indication may be received subsequent to the expiration of a delay period.

18 Claims, 5 Drawing Sheets

U.S. PATENT DOCUMENTS

| | | | |
|---|---|---|---|
| 7,694,161 B2 * | 4/2010 | Buch et al. | 713/324 |
| 7,721,052 B2 * | 5/2010 | Ogasawara et al. | 711/152 |
| 7,741,868 B2 * | 6/2010 | Nguyen et al. | 326/30 |
| 7,782,707 B2 * | 8/2010 | Nishikawa et al. | 365/233.12 |
| 7,844,876 B2 * | 11/2010 | Wyatt et al. | 714/745 |
| 7,907,464 B2 * | 3/2011 | Oh | 365/222 |
| 7,930,470 B2 * | 4/2011 | Brittain et al. | 711/105 |
| 8,019,957 B1 * | 9/2011 | White et al. | 711/167 |
| 8,042,999 B2 * | 10/2011 | Jeong et al. | 374/170 |
| 8,118,483 B2 * | 2/2012 | Cox | 374/170 |
| 2003/0158697 A1 | 8/2003 | Gold et al. | |
| 2004/0001527 A1 | 1/2004 | Grannes et al. | |
| 2004/0017700 A1 * | 1/2004 | Demone | 365/200 |
| 2005/0135167 A1 * | 6/2005 | Manabe | 365/201 |
| 2006/0029122 A1 | 2/2006 | Bowden et al. | |
| 2006/0077742 A1 * | 4/2006 | Shim et al. | 365/222 |
| 2006/0190210 A1 * | 8/2006 | Mukherjee | 702/130 |
| 2007/0001862 A1 * | 1/2007 | Zweig | 340/588 |
| 2007/0098041 A1 * | 5/2007 | Seo | 374/170 |
| 2007/0132493 A1 * | 6/2007 | Fujisawa et al. | 327/158 |
| 2008/0007319 A1 * | 1/2008 | Cox | 327/512 |
| 2008/0120443 A1 * | 5/2008 | Rajan et al. | 710/24 |
| 2009/0037778 A1 * | 2/2009 | Resnick | 714/48 |
| 2009/0116322 A1 * | 5/2009 | Han et al. | 365/201 |
| 2009/0323758 A1 * | 12/2009 | Im | 374/100 |
| 2010/0306459 A1 * | 12/2010 | Lin | 711/105 |
| 2011/0131004 A1 * | 6/2011 | Cloetens | 702/132 |

FOREIGN PATENT DOCUMENTS

| | | |
|---|---|---|
| JP | 11123180 | 10/1997 |

OTHER PUBLICATIONS

Graphics DDR3 On-Die Termination and Thermal considerations, Technical Note, TN-44-02, Micron KesignLine vol. 11, issue 4, 4Q02, 2003, 7 pages.

Iyer et al: System Memory Power and Thermal Management Techniques in Mobile Platforms, Technology@Intel Magazine, Mar. 2006, 12 page.

Naveh et al: Power and Thermal Management in the Intel core Duo Processor, Intel Technology Journal, vol. 10, Issue 2, May 14, 2006, ISSN 1535-864X, pp. 109-122, 16 pages.

Iyer et al: System Memory Power and Thermal Management in Platforms Built on Intel Centrino Duo Mobile Technology, Intel Technology Journal, vol. 10, issue 2, May 15, 2006, ISSN 1535-864X, pp. 123-132, 12 pages.

"Examination Report for Patent Application No. GB0714781.2", (Dec. 10, 2008), Whole Document.

"First Office Action for Chinese Patent Application No. 200710138688.X", (Mar. 20, 2009), Whole Document.

"Search and Examination Report for Patent Application No. GB0714781.2", (Nov. 6, 2007), Whole Doucment.

"Office Action for Taiwan Patent Application No. 96127787", (Oct. 25, 2010), Whole Document.

"Notice of Allowance including English Translation for Taiwan Patent Application No. 96127787", (Feb. 14, 2011), Whole Document.

"Office Action for German Patent Application No. 10 2007 035 895.6-55", (Mar. 29, 2011), Whole Document.

Park, Churoo , et al., "A 512-mb DDR3 SDRAM prototype with CIO minimization and self-calibration techniques, Solid-State Circuits, IEEE Journal of, vol. 41, No. 4, pp. 831-838, Apr. 2006, doi:10.1109/JSSC.2006.870808", (Apr. 2006), 831-838.

* cited by examiner

DYNAMIC POWER CONTROL OF A MEMORY DEVICE THERMAL SENSOR

TECHNICAL FIELD

Embodiments of the invention generally relate to the field of integrated circuits and, more particularly, to systems, methods and apparatuses for the dynamic power control of a memory device thermal sensor.

BACKGROUND

Memory is frequently packaged on modules that contain several similar (or identical) integrated circuits such as dynamic random access memory (DRAM) devices. The temperature of a DRAM is largely determined by its activity level (e.g., the rate of reads and writes into the memory cells). If the temperature of the memory is too high, then the data stored in the memory may be corrupted or lost. In addition, the memory may be damaged by excessively high temperatures. Also, the thermal constraints of memory devices may limit the maximum data access rates that memory device interfaces can support.

On-die thermal sensors may be used to collect DRAM thermal data. In some systems, each DRAM may include an on-die thermal sensor to collect thermal data and to provide the collected thermal data to, for example, a memory controller. The on-die thermal sensors may be capable of triggering an event when a preprogrammed thermal threshold is reached.

In conventional systems, the on-die thermal sensors are powered on whenever the system is powered on. Since the on-die thermal sensors are always on, they are constantly consuming power. The constant consumption of power may deplete battery supplied power (e.g., in mobile applications) and may generate heat that needs to conducted away from the platform.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for the dynamic power control of a memory device power sensor. In some embodiments, a memory device includes an on-die thermal sensor and control logic to dynamically enable or disable the on-die thermal sensor. A host (e.g., a memory controller) dynamically enables or disables the thermal sensor. The amount of power consumed by the thermal sensor may be reduced because it can be dynamically disabled. As is further discussed below, the host may delay the issuance of a command to sense thermal data until the thermal sensor is ready to take an accurate reading.

Figure 1:
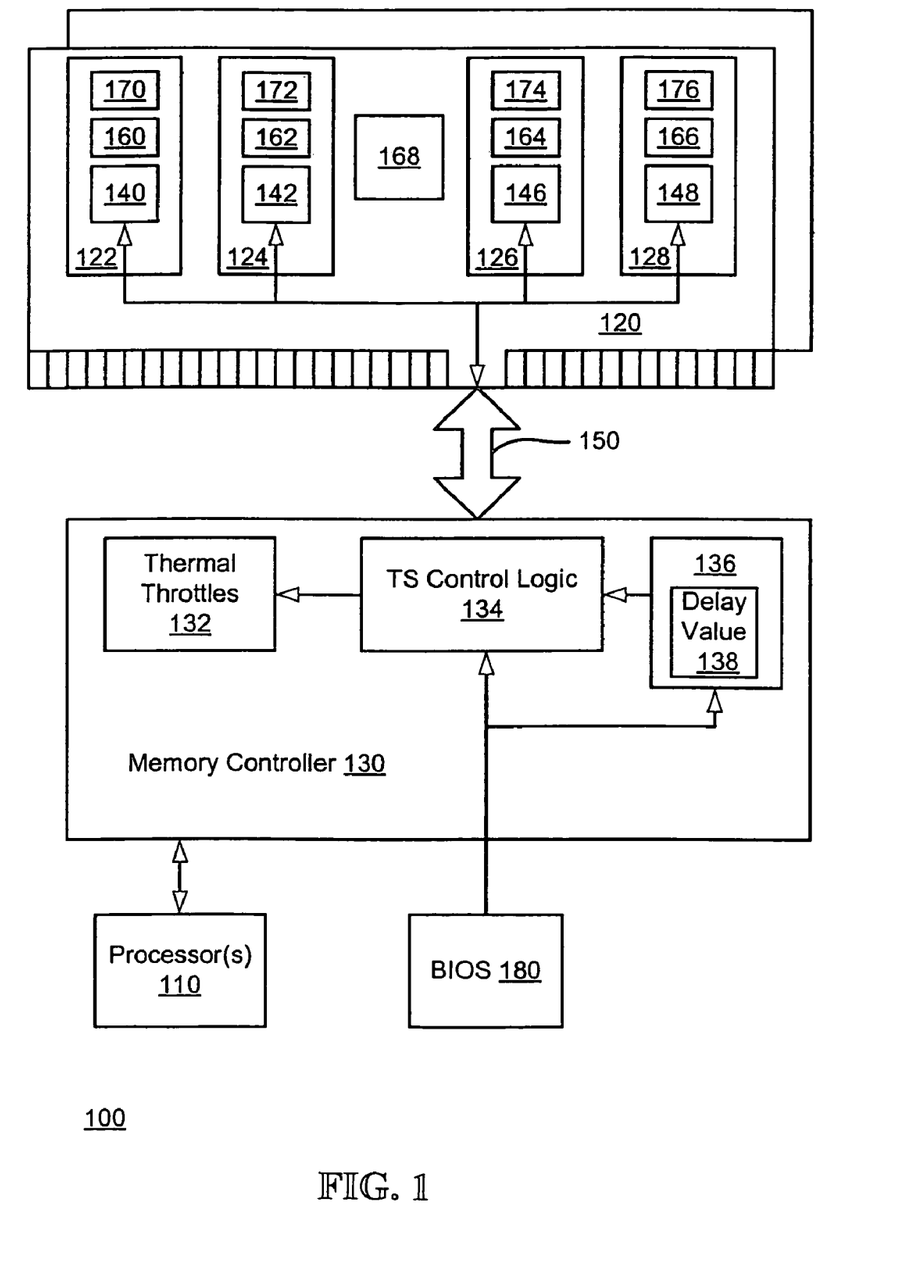
FIG. 1 is a high-level block diagram illustrating selected aspects of a computing system, implemented according to an embodiment of the invention.

FIG. 1 is a high-level block diagram illustrating selected aspects of a computing system implemented according to an embodiment of the invention. System 100 includes processor(s) 110, memory module 120, and memory controller 130. Processor(s) 110 may be any processing element including, for example, a central processing unit, an embedded processor, a partitioned processor, a multicore processor, and the like.

Memory module 120 includes memory devices 122-128. For ease of illustration, four memory devices are shown. It is to be appreciated that embodiments of the invention may include more memory devices or fewer memory devices. Memory devices 122-128 may be any of a wide variety of memory devices including, for example, DRAMs, synchronous DRAMs (SDRAMs), and the like.

In some embodiments, each memory device 122-128 includes a corresponding on-die thermal sensor 140-148. The term "on-die" refers to the disposition of a thermal sensor onto the same die as a corresponding integrated circuit (e.g., the same die as a DRAM). An on-die thermal sensor may be any of a wide range of on-die thermal sensors including, for example, a thermal diode. On-die thermal sensors 140-148 sense thermal data associated with memory devices 122-128. The term "thermal data" broadly refers to information that provides an indication of device temperature. The term "thermal data" may also include information that indicates whether one or more temperature thresholds have been crossed.

In the illustrated embodiment, each memory device 122-128 also includes corresponding enable logic 160-166 and storage elements 170-176. Enable logic 160-166 includes logic to dynamically enable and/or disable corresponding thermal sensors 140-148. Enabling a thermal sensor includes powering on the thermal sensor. Similarly, disabling a thermal sensor includes powering off the thermal sensor. Enabling logic 160-166 may be implemented using almost any kind of logic suitable for enabling and/or disabling an on-die thermal sensor. An example of enabling logic 160-166 is further discussed below with reference to FIGS. 2-4.

As shown in FIG. 1, each memory device 122-128 may also include a corresponding storage element 170-176. Storage elements 170-176 may store thermal data for corresponding thermal sensors 140-148. In some embodiments, for example, the thermal sensors 140-148 sense the thermal data and then pass the thermal data to storage elements 170-176. Storage elements 170-176 may be registers, collections of registers, and/or portions of registers. In some embodiments, storage elements 170-176 are DRAM multipurpose registers (MPRs).

In alternative embodiments, only a selected subset of memory devices 122-128 includes an on-die thermal senor 140-148 and/or enable logic 160-166. For example, in some embodiments, every Nth (e.g., second, third, fourth, etc.) memory device may have an on-die thermal sensor and associated toggle logic. Alternatively, at least one memory device on each side of memory module 120 may include an on-die thermal sensor and associated toggle logic. In yet other embodiments, at least one memory device on memory module 120 includes an on-die thermal sensor and associated toggle logic.

Memory controller 130 provides an interface between processor 110 and memory module 120. In some embodiments, memory controller 130 includes thermal throttles 132, thermal sensor (TS) control logic 134, and delay value 136. In some embodiments, thermal throttles 132 provide thermal control mechanisms for module 120 and/or memory devices 122-128. For example, thermal throttles 132 may limit the rate of reads and writes to memory devices 122-128. TS control logic 134 controls thermal sensors 140-148. For example, TS control logic 134 may include logic to control when thermal sensors 140-148 sense thermal data. In some embodiments, sensing thermal data, includes enabling a thermal sensor and, after an appropriate delay, instructing the thermal sensor to sense thermal data. The reason for the delay between enabling a sensor and sensing data is that, in some embodiments, a sensor setup time is appropriate so that a recently enabled sensor can stabilize itself before it takes a reading.

In some embodiments, storage element 136 stores the delay value 138. Storage element 136 may be any element suitable for storing a value including, for example, a register, a collection of registers, and/or a portion of a register. Delay value 138 specifies a delay between when a memory device is enabled and when the thermal sensor is triggered to sense thermal data. In some embodiments, delay value 138 may be a fixed value that is written to storage element 136 by Basic Input/Output System (BIOS) 180 during, for example, system boot up. In other embodiments, delay value 138 is programmable. In such embodiments, storage element 136 may be, for example, a programmable register.

Memory interconnect 150 couples memory module 120 with memory controller 130. In some embodiments, memory interconnect 150 is a multi-drop bus. In alternative embodiments, memory interconnect 150 is a serial interconnect.

Figure 2:
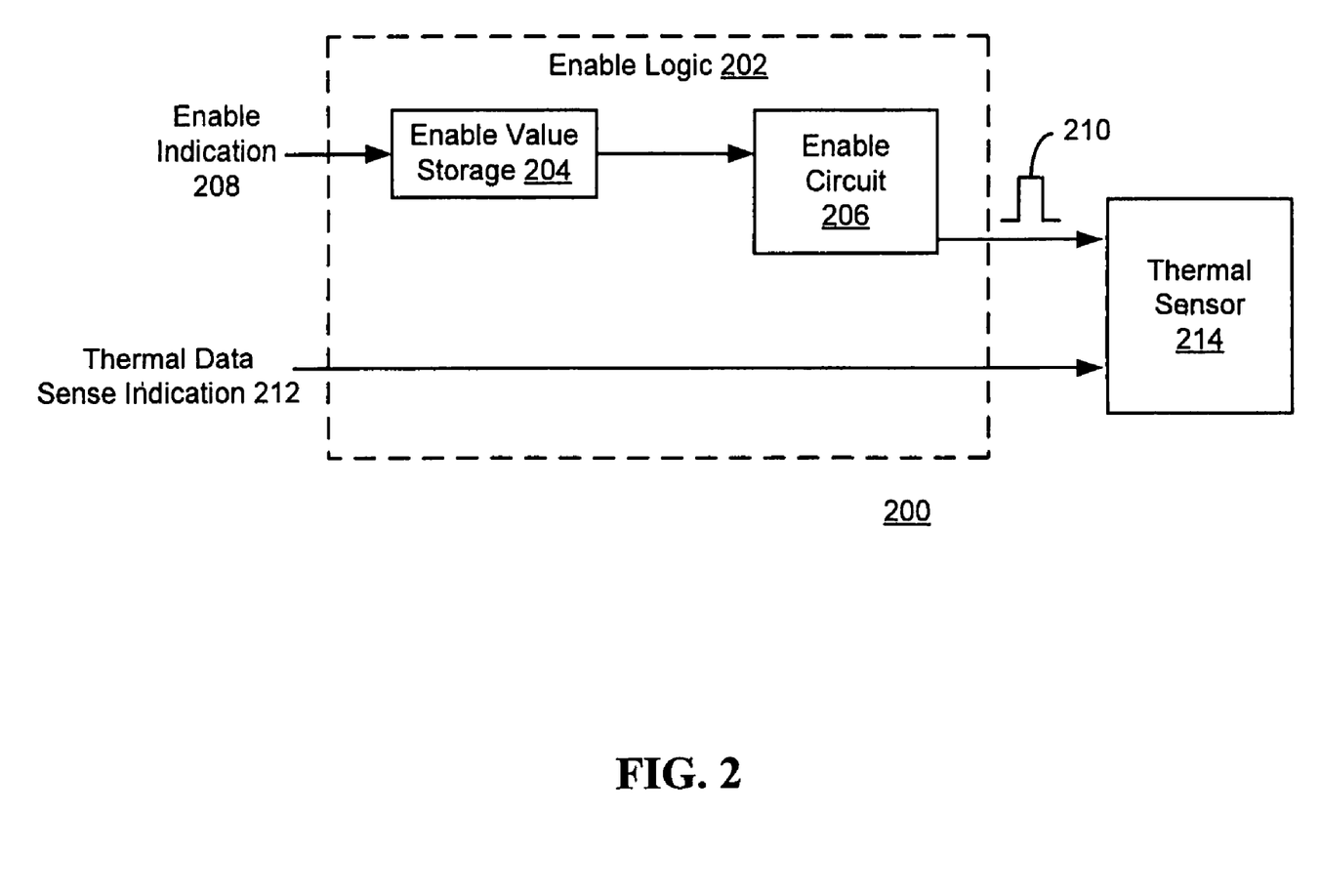
FIG. 2 is a block diagram illustrating selected aspects of enable logic, implemented according to an embodiment of the invention.

FIG. 2 is a block diagram showing selected aspects of a memory device 200. Memory device 200 includes enable logic 202 and thermal sensor 214. In some embodiments, enable logic 202 provides logic to dynamically power-on and power-off thermal sensor 214. Enable logic 202 may include storage element 204 and enable circuit 206. Storage element 204 stores enable indication 208 which may be received from a controller such as memory controller 130 shown in FIG. 1. In some embodiments, enable indication 208 is a signal (e.g., a command, an instruction, a bit, a collection of bits, etc.) from the controller instructing enable logic 202 to dynamically power-on or power-off thermal sensor 214. For example, in some embodiments, enable indication 208 is value of a mode register (MR) bit (or bits) such as MR3. Enable circuit 206 includes logic to power-on/off thermal sensor 214. In some embodiments, enable circuit 206 provides enable signal 210 to thermal sensor 214.

In some embodiments, thermal sensor 214 senses thermal data after an appropriate delay time has expired. As discussed above, the purpose of the delay time is to allow thermal sensor 214 to stabilize before it takes a reading. Thus, the length of the delay time may depend on the set-up period of a thermal sensor. In some embodiments, the controller sends thermal data sense indication 212 after the delay time has expired. Thermal data sense indication 212 may be any signal (e.g., command, instruction, bit, collection of bits, etc.) suitable for triggering thermal sensor 214 to take a measurement. In some embodiments, the thermal data sense indication 212 is a memory interconnect impedance calibration command such as the ZQ calibration command used in double data rate (DDR) 3 technology. The memory interconnect impedance calibration period provides a quiet time in the memory device operation when (almost) no other memory device activity is occurring. The power supplies are relatively quiet during this time which makes it a suitable time for the temperature sensor to make a measurement (e.g., sense thermal data).

Figure 3:
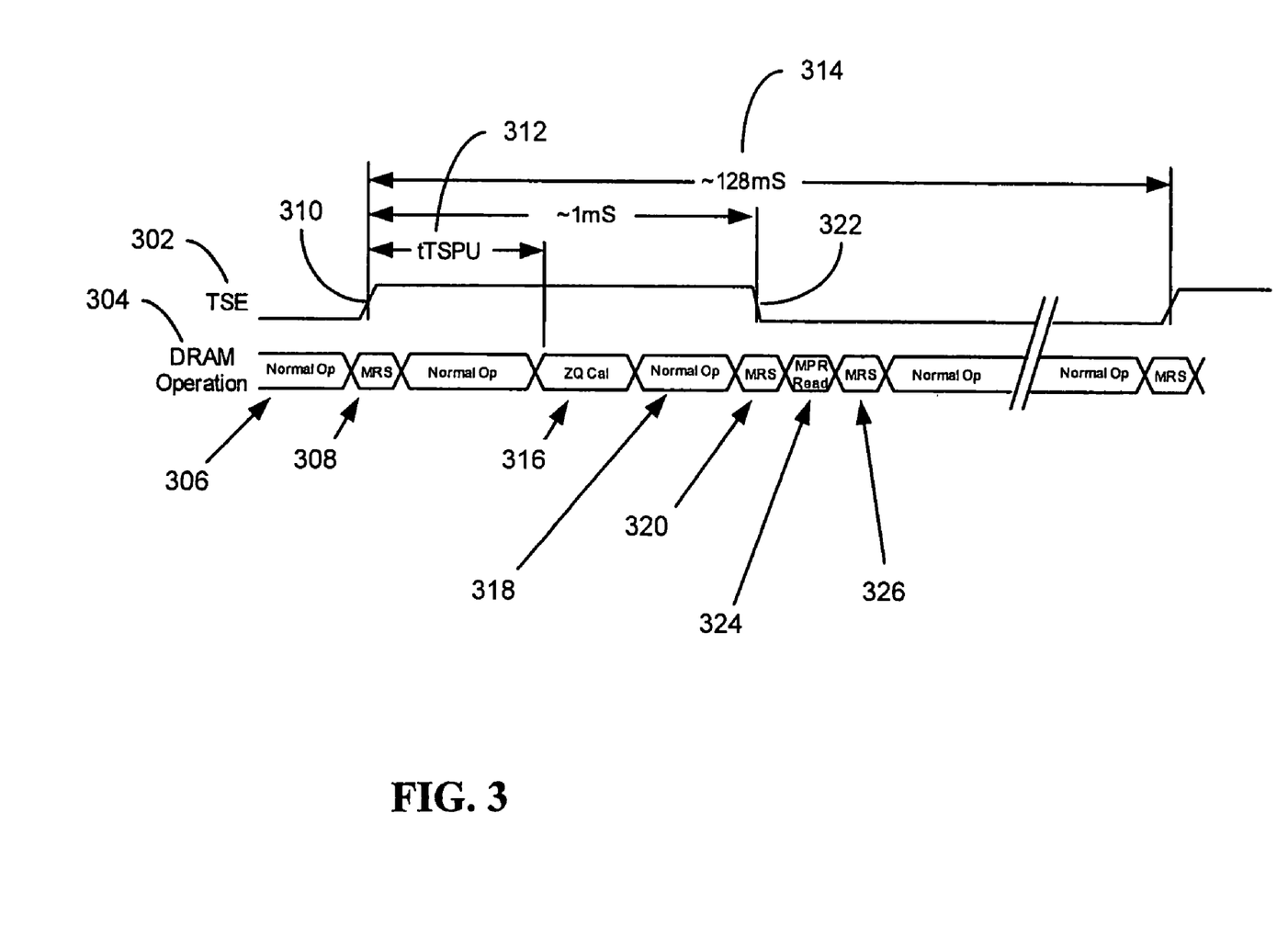
FIG. 3 is a timing diagram illustrating selected aspects of the dynamic power control of a memory device thermal sensor, implemented according to an embodiment of the invention.

FIG. 3 is a timing diagram illustrating selected aspects of the dynamic power control of a memory device, implemented according to an embodiment of the invention. Signal 302 illustrates a thermal sensor enable signal (TSE) and signal 304 illustrates the DRAM operation (e.g., from the perspective of the DRAM command bus). Initially, the TSE is de-asserted and the DRAM is performing normal operations (e.g., read, write, etc.) as shown by reference number 306. The host (e.g., memory controller 130, shown in FIG. 1) issues an MRS command at 308. The MRS command includes an enable indication (e.g., a bit having an appropriate value) to power-on a thermal sensor. The enable indication is a bit (or bits) having a value that enables or disables the thermal sensor. In response to the enable indication, the TSE is asserted (310).

In some embodiments, the command bus resumes normal operation for a specified period of time (e.g., a delay time) so that the thermal sensor can stabilize before it takes a reading. In the illustrated embodiment, tTSPU is the delay time between when the thermal sensor is enabled and when the thermal sensor senses thermal data. In some embodiments tTSPU is part of a specification (e.g., a signaling specification). The value of tTSPU may be determined by the actual circuit requirements. In general, the value of tTSPU may be less than the period between temperature readings which, in the illustrated embodiment, is approximately 128 milliseconds (314).

In some embodiments, the host issues a thermal data sense indication after the specified delay time has transpired. For example, in the illustrated embodiment, the host issues a ZQ calibration command at 316. The DRAM includes logic (e.g., enable logic 202, shown in FIG. 2) to determine that the TSE signal is asserted and the ZQ calibration command has been issued. In some embodiments, the DRAM may attempt to sense the thermal data on every ZQ calibration command and the data but the data may not be valid unless the thermal sensor has been enabled for at least a tTSPU. In alternative embodiments, the thermal data sense indication is a different event such as a read command, a write command, or a dedicated signal.

After the ZQ calibration command, normal DRAM operations may occur (318). At an appropriate point in time, the host reads the thermal data and powers-down the thermal sensor. For example, in the illustrated embodiment, the host issues an MRS command at 320. This MRS command includes a bit to disable the thermal sensor and a bit to place the DRAM in a multipurpose register (MPR) read mode. In response, the TSE signal de-asserts at 322. The host reads the multipurpose registers at 324. The host may return the DRAM to normal operation at 326. It is to be appreciated that the sequence shown in FIG. 3 may be (wholly or substantially) repeated each time the host determines that it is appropriate for the thermal sensor to sense thermal data.

Figure 4:
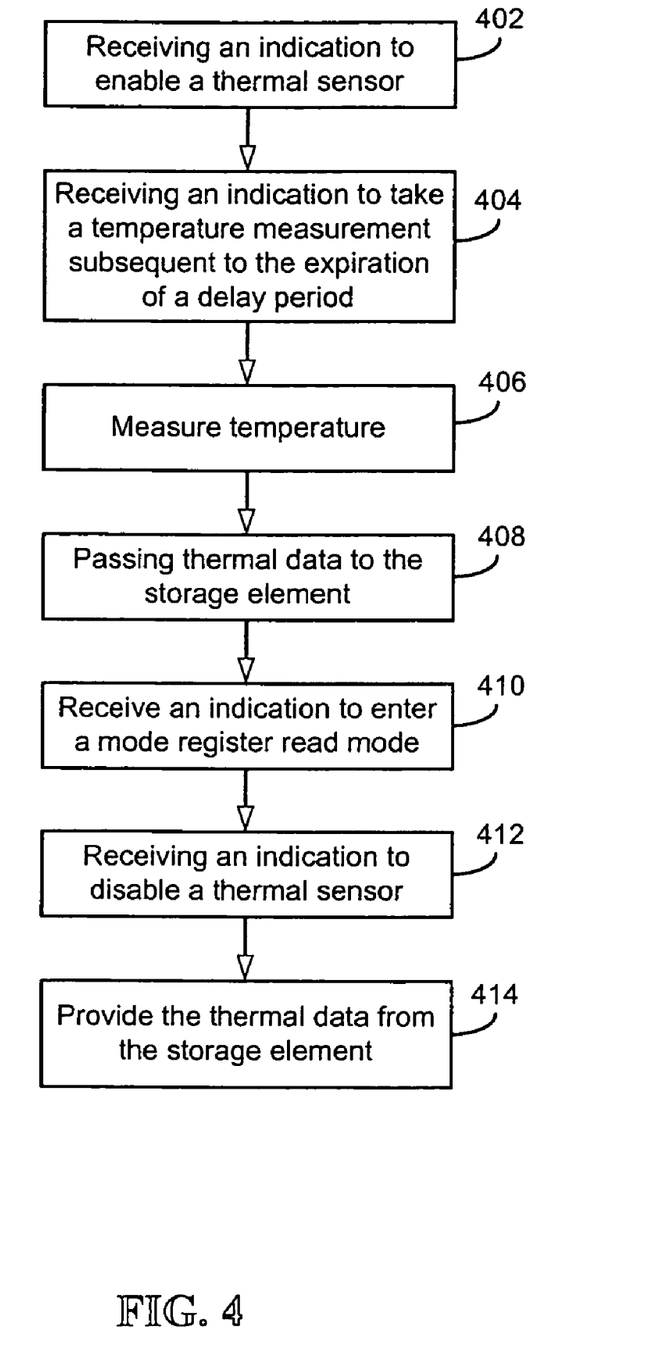
FIG. 4 is a flow diagram illustrating selected aspects of a method for the dynamic power control of a memory device thermal sensor, according to an embodiment of the invention.

FIG. 4 is a flow diagram illustrating selected aspects of a method for the dynamic power control of a memory device according to an embodiment of the invention. Referring to reference number 402, a memory device (e.g., a DRAM) receives an enable indication from a host such as a memory controller. The term "enable indication" refers to any signal, command, instruction, and the like from the host having the purpose of powering-on the thermal sensor. In some embodiments, the enable indication is one or more bits of a mode register set (MRS) command. For example, in some embodiments, the enable indication is the value of the MR3 bit.

Referring to process block 404, the memory device receives a thermal data sense indication from the host. The term "thermal data sense indication" refers to any signal, instruction, command, and the like to trigger the thermal sensor to take a temperature reading. In some embodiments, an existing event is used to provide the thermal sense indication so that logic to provide a new command need not be added to the host. For example, in some embodiments, a memory interconnect impedance calibration command is used to provide the thermal data sense indication. This helps to ensure that the temperature measurement occurs when there is almost no memory device activity to interfere with the measurement.

The "delay period" refers to a delay between when the thermal sensor is enabled and when the temperature measurement is triggered. This delay period may provide sufficient time for the thermal sensor to stabilize so that it can take an accurate reading. In some embodiments, the signaling specification for the memory device may include a specification for the delay period (e.g., tTSPU as shown in FIG. 3).

After being enabled and having received the thermal data sense indication, the thermal sensor measures a temperature at 406. The thermal sensor passes the data to a storage element (e.g., storage elements 170-176) at 408. The storage element may be, for example, a register, a collection of registers, or a portion of a register. In some embodiments, the storage element is one or more bits of a multipurpose register (MPR).

Referring to process block 410, the memory device receives an indication to enter a register read mode. This indication may be any signal, command, instruction, value, and the like that indicates that the host is going to read a storage element (e.g., one or more registers) of the memory device. For example, in some embodiments, the indication is a value of one or more bits of an MRS command.

Referring to process block 412, the memory device receives an indication to disable the thermal sensor. The indication to disable the thermal sensor may be any signal, command, instruction, value, and the like that indicates that the host is disabling the thermal sensor. In some embodiments, the indication to disable the thermal sensor is a value of one or more bits of an MRS command.

In some embodiments, two or more indications may be provided by the same command. For example, in some embodiments, the indication to enter the register read mode and the indication to disable the thermal sensor are both provided by bit values of a single MRS command. In other embodiments, the indications may be provided by different commands, signals, values, instructions, and the like.

Figure 5:
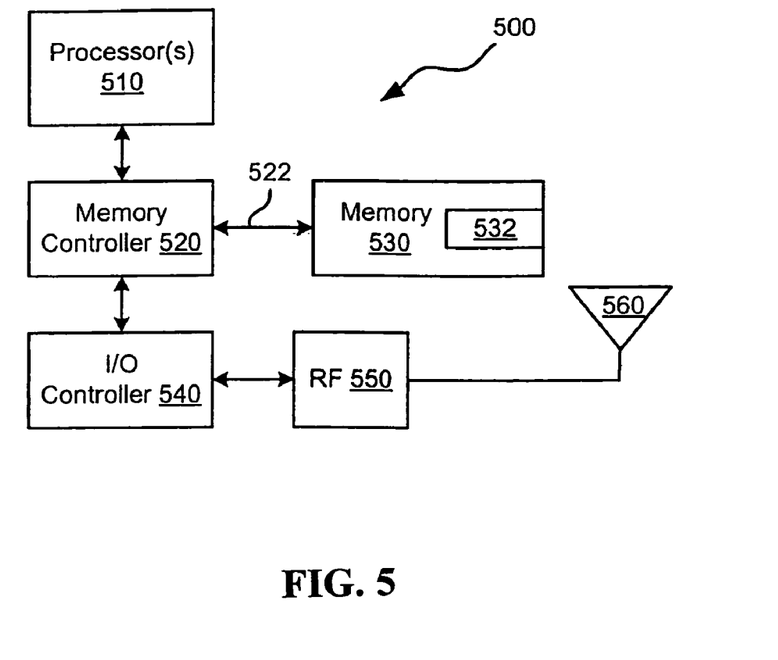
FIG. 5 is a block diagram illustrating selected aspects of an electronic system according to an embodiment of the invention.

Referring to process block 414, the memory device provides the thermal data to the host. In some embodiments, providing the thermal data to the host includes the host reading one or more multipurpose registers of the memory device. In some embodiments, the host performs a memory read, while the memory device is in a register read mode, to read the multipurpose purpose registers containing the thermal data. In some embodiments, FIG. 5 is a block diagram illustrating selected aspects of an electronic system according to an embodiment of the invention. Electronic system 500 includes processor 510, memory controller 520, memory 530, input/output (I/O) controller 540, radio frequency (RF) circuits 550, and antenna 560. In operation, system 500 sends and receives signals using antenna 560, and these signals are processed by the various elements shown in FIG. 5. Antenna 560 may be a directional antenna or an omni-directional antenna. As used herein, the term omni-directional antenna refers to any antenna having a substantially uniform pattern in at least one plane. For example, in some embodiments, antenna 560 may be an omni-directional antenna such as a dipole antenna or a quarter wave antenna. Also, for example, in some embodiments, antenna 560 may be a directional antenna such as a parabolic dish antenna, a patch antenna, or a Yagi antenna. In some embodiments, antenna 560 may include multiple physical antennas.

Radio frequency circuit 550 communicates with antenna 560 and I/O controller 540. In some embodiments, RF circuit 550 includes a physical interface (PHY) corresponding to a communication protocol. For example, RF circuit 550 may include modulators, demodulators, mixers, frequency synthesizers, low noise amplifiers, power amplifiers, and the like. In some embodiments, RF circuit 550 may include a heterodyne receiver, and in other embodiments, RF circuit 550 may include a direct conversion receiver. For example, in embodiments with multiple antennas 560, each antenna may be coupled to a corresponding receiver. In operation, RF circuit 550 receives communications signals from antenna 560 and provides analog or digital signals to I/O controller 540. Further, I/O controller 540 may provide signals to RF circuit 550, which operates on the signals and then transmits them to antenna 560.

Processor(s) 510 may be any type of processing device. For example, processor 510 may be a microprocessor, a microcontroller, or the like. Further, processor 510 may include any number of processing cores or may include any number of separate processors.

Memory controller 520 provides a communication path between processor 510 and other elements shown in FIG. 5. In some embodiments, memory controller 520 is part of a hub device that provides other functions as well. As shown in FIG. 5, memory controller 520 is coupled to processor(s) 510, I/O controller 540, and memory 530.

Memory 530 may include multiple memory devices. These memory devices may be based on any type of memory technology. For example, memory 530 may be random access memory (RAM), dynamic random access memory (DRAM), static random access memory (SRAM), nonvolatile memory such as FLASH memory, or any other type of memory. Memory 530 may represent a single memory device or a number of memory devices on one or more modules. In some embodiments, at least one of the memory devices includes an on-die thermal sensor and associated enable logic 532. Enable logic 532 supports the dynamic power control of the thermal sensor.

Memory controller 520 provides data through interconnect 522 to memory 530 and receives data from memory 530 in response to read requests. Commands and/or addresses may be provided to memory 530 through interconnect 522 or through a different interconnect (not shown). Memory controller 530 may receive data to be stored in memory 530 from processor 510 or from another source. Memory controller 520 may provide the data it receives from memory 530 to processor 510 or to another destination. Interconnect 522 may be a bi-directional interconnect or a unidirectional interconnect. Interconnect 522 may include a number of parallel conductors. The signals may be differential or single ended. In some embodiments, interconnect 522 operates using a forwarded, multiphase clock scheme. In some embodiments, memory controller 520 includes thermal sensor control logic (not shown) to dynamically control one or more thermal sensors.

Memory controller 520 is also coupled to I/O controller 540 and provides a communications path between processor(s) 510 and I/O controller 540. I/O controller 540 includes circuitry for communicating with I/O circuits such as serial ports, parallel ports, universal serial bus (USB) ports and the like. As shown in FIG. 5, I/O controller 540 provides a communication path to RF circuits 550.

Figure 6:
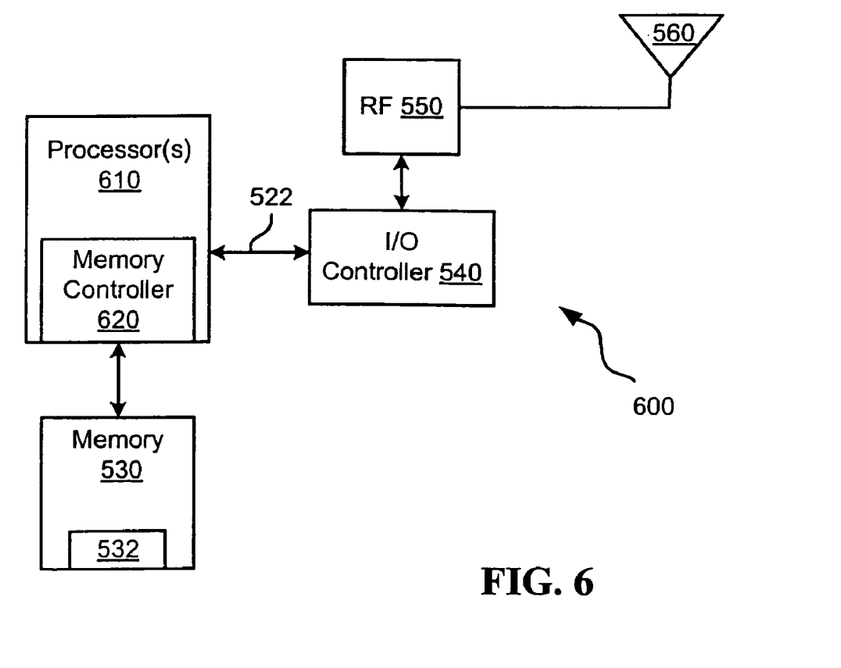
FIG. 6 is a bock diagram illustrating selected aspects of an electronic system according to an alternative embodiment of the invention.

FIG. 6 is a bock diagram illustrating selected aspects of an electronic system according to an alternative embodiment of the invention. Electronic system 600 includes memory 530, I/O controller 540, RF circuits 550, and antenna 560, all of which are described above with reference to FIG. 5. Electronic system 600 also includes processor(s) 610 and memory controller 620. As shown in FIG. 6, memory controller 620 may be on the same die as processor(s) 610. Processor(s) 610 may be any type of processor as described above with reference to processor 510. In some embodiments, memory controller 620 includes thermal sensor control logic (not shown) to dynamically control one or more thermal sensors. Example systems represented by FIGS. 5 and 6 include desktop computers, laptop computers, servers, cellular phones, personal digital assistants, digital home systems, and the like.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A system comprising:
    a memory controller including:
        a storage element to store a delay value specifying a delay period; and
        thermal sensor control logic coupled to the storage element, the thermal sensor control logic to send an enable indication from the memory controller, the thermal sensor control logic further to send a thermal data sense indication in response to an expiration of the specified delay period after the sending the enable indication;
    a dynamic random access memory (DRAM) device coupled with the memory controller, the DRAM device including,
        enable logic to receive the enable indication from the memory controller and to assert an enable signal in response to the enable indication; and
        an on-die thermal sensor coupled with the enable logic, wherein the enable signal is to power on the on-die thermal sensor, wherein the thermal data sense indication is to trigger a measurement by the on-die thermal sensor, wherein the delay period is based upon a set-up time for allowing the on-die thermal sensor to stabilize after powering on.

2. The system of claim 1, wherein, the DRAM is an element of a memory module.

3. The system of claim 1, wherein the enable logic comprises:
    a storage element to store the enable indication; and
    an enable circuit to provide the enable signal to the on-die thermal sensor.

4. The system of claim 3, wherein the enable circuit is configured to receive, as an input, the enable indication and the thermal data sense indication.

5. The system of claim 1, wherein the thermal data sense indication is a memory interconnect impedance calibration command.

6. The system of claim 5, wherein the memory interconnect impedance calibration command is a ZQ calibration command.

7. The system of claim 3, wherein the enable indication comprises one or more bits of a mode register set (MRS) command.

8. The system of claim 3, wherein the storage element is at least a portion of a mode register.

9. A memory controller device comprising:
    a storage element to store a delay value specifying a delay period based upon a set-up time for allowing an on-die thermal sensor of a memory device to stabilize after powering on, the memory controller to couple to the memory device; and
    thermal sensor control logic coupled to the storage element, the thermal sensor control logic to send an enable indication from the memory controller to enable logic of the memory device, wherein the enable logic asserts an enable signal in response to the enable indication, the enable signal to power on the on-die thermal sensor, the thermal sensor control logic further to send a thermal data sense indication to trigger a measurement by the on-die thermal sensor, wherein the thermal data sense indication is sent in response to an expiration of the specified delay period after the sending the enable indication.

10. The memory controller device of claim 9, wherein the enable indication comprises one or more bits of a mode register set command.

11. The memory controller device of claim 9, wherein the thermal data sense indication includes a memory interconnect impedance calibration command.

12. The memory controller device of claim 11, wherein the memory interconnect impedance calibration command includes a ZQ calibration command.

13. The memory controller device of claim 9, wherein the delay period is less than a period between successive thermal readings by the on-die thermal sensor.

14. A method at a memory controller device, the method comprising:
- storing a delay value specifying a delay period based upon a set-up time for allowing an on-die thermal sensor of a memory device to stabilize after powering on, wherein the memory controller is coupled to the memory device;
- sending an enable indication from the memory controller to enable logic of the memory device, wherein the enable logic asserts an enable signal in response to the enable indication, the enable signal to power on the on-die thermal sensor; and
- sending a thermal data sense indication to trigger a measurement by the on-die thermal sensor, wherein the thermal data sense indication is sent in response to an expiration of the specified delay period after the sending the enable indication.

15. The memory controller device of claim 14, wherein the enable indication comprises one or more bits of a mode register set command.

16. The memory controller device of claim 14, wherein the thermal data sense indication includes a memory interconnect impedance calibration command.

17. The memory controller device of claim 16, wherein the memory interconnect impedance calibration command includes a ZQ calibration command.

18. The memory controller device of claim 14, wherein the delay period is less than a period between successive thermal readings by the on-die thermal sensor.

* * * * *